(12) United States Patent
Kim et al.

(10) Patent No.: US 7,193,801 B2
(45) Date of Patent: Mar. 20, 2007

(54) METHOD AND APPARATUS FOR TESTING A SERVO CIRCUIT OF A READ/WRITE HEAD SYSTEM

(75) Inventors: Seonki Kim, Allentown, PA (US); Fan Zhou, Bethlehem, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 10/992,316

(22) Filed: Nov. 18, 2004

(65) Prior Publication Data

US 2006/0103962 A1    May 18, 2006

(51) Int. Cl.
G11B 5/09    (2006.01)

(52) U.S. Cl. .............. 360/48; 360/31; 360/39

(58) Field of Classification Search ................ None
See application file for complete search history.

(56) References Cited

U.S. PATENT DOCUMENTS

| | | | |
|---|---|---|---|
| 5,121,263 A * | 6/1992 | Kerwin et al. ............. 360/53 |
| 5,422,760 A * | 6/1995 | Abbott et al. ............. 360/46 |
| 5,625,508 A * | 4/1997 | Brown et al. ............. 360/77.02 |
| 5,661,615 A * | 8/1997 | Waugh et al. ............. 360/75 |
| 5,754,353 A * | 5/1998 | Behrens et al. ............. 360/53 |
| 5,838,512 A * | 11/1998 | Okazaki ................... 360/51 |
| 5,862,005 A * | 1/1999 | Leis et al. ................. 360/27 |
| 5,909,336 A * | 6/1999 | Schaffner et al. ......... 360/77.08 |
| 6,049,440 A * | 4/2000 | Shu ........................ 360/77.04 |
| 6,172,828 B1 * | 1/2001 | Tsunoda et al. ............ 360/46 |
| 6,181,505 B1 * | 1/2001 | Sacks et al. ............. 360/77.08 |
| 6,208,477 B1 * | 3/2001 | Cloke et al. .............. 360/31 |
| 6,256,159 B1 * | 7/2001 | Bhakta .................... 360/40 |
| 6,282,501 B1 * | 8/2001 | Assouad .................. 702/117 |
| 6,292,317 B1 * | 9/2001 | Alexander ................ 360/31 |
| 6,292,912 B1 * | 9/2001 | Cloke et al. ............. 714/718 |
| 6,646,822 B1 * | 11/2003 | Tuttle et al. ............. 360/46 |
| 6,651,192 B1 * | 11/2003 | Viglione et al. .......... 714/47 |
| 6,657,802 B1 * | 12/2003 | Ashley et al. ............. 360/51 |
| 6,760,170 B2 * | 7/2004 | Siew et al. ............... 360/31 |
| 6,912,099 B2 * | 6/2005 | Annampedu et al. ....... 360/39 |
| 6,934,100 B2 * | 8/2005 | Ueno ..................... 360/31 |
| 2003/0011918 A1 * | 1/2003 | Heydari et al. ............ 360/39 |
| 2003/0053235 A1 * | 3/2003 | Kikugawa et al. .......... 360/31 |
| 2004/0202229 A1 * | 10/2004 | Raphaeli et al. ........... 375/145 |
| 2005/0105200 A1 * | 5/2005 | Chainer et al. ............ 360/51 |

* cited by examiner

Primary Examiner—Andrea Wellington
Assistant Examiner—Dismery Mercedes

(57) ABSTRACT

A test pattern generator for generating test patterns for testing a servo circuit of a read/write head system. The pattern generator uses a relatively simple encoding technique to produce test patterns that have peaks with phase characteristics similar or identical to the phase characteristics of peaks of real data patterns, such as real BPS and sync mark patterns, for example, stored on a hard disk. The encoded data patterns are output to servo control logic to test the ability of the servo control logic to detect the patterns.

15 Claims, 4 Drawing Sheets

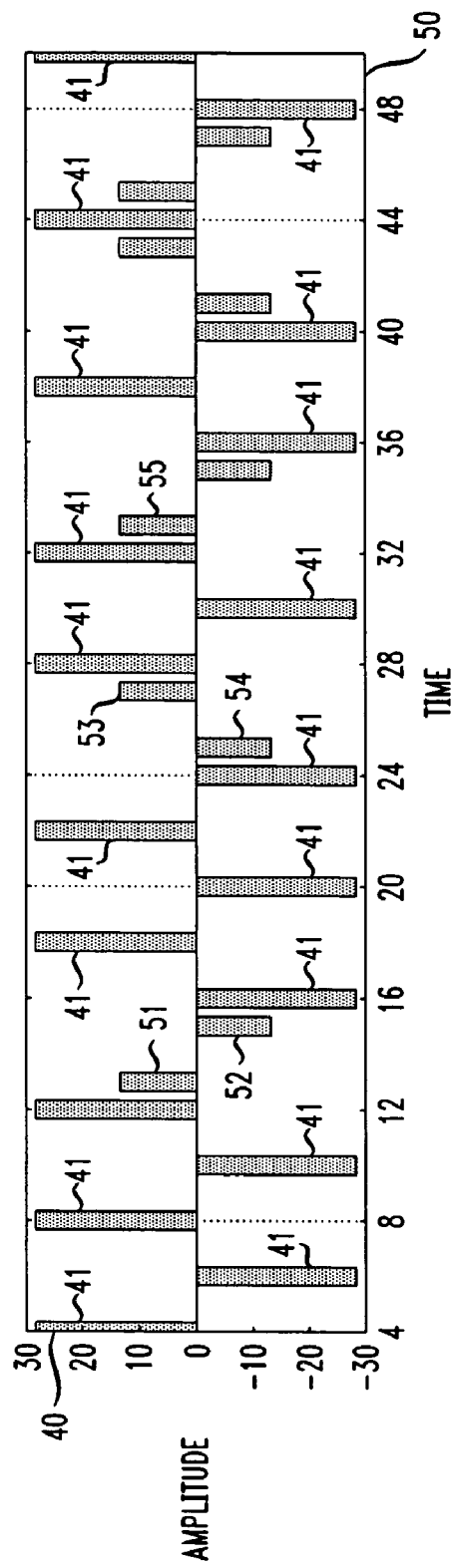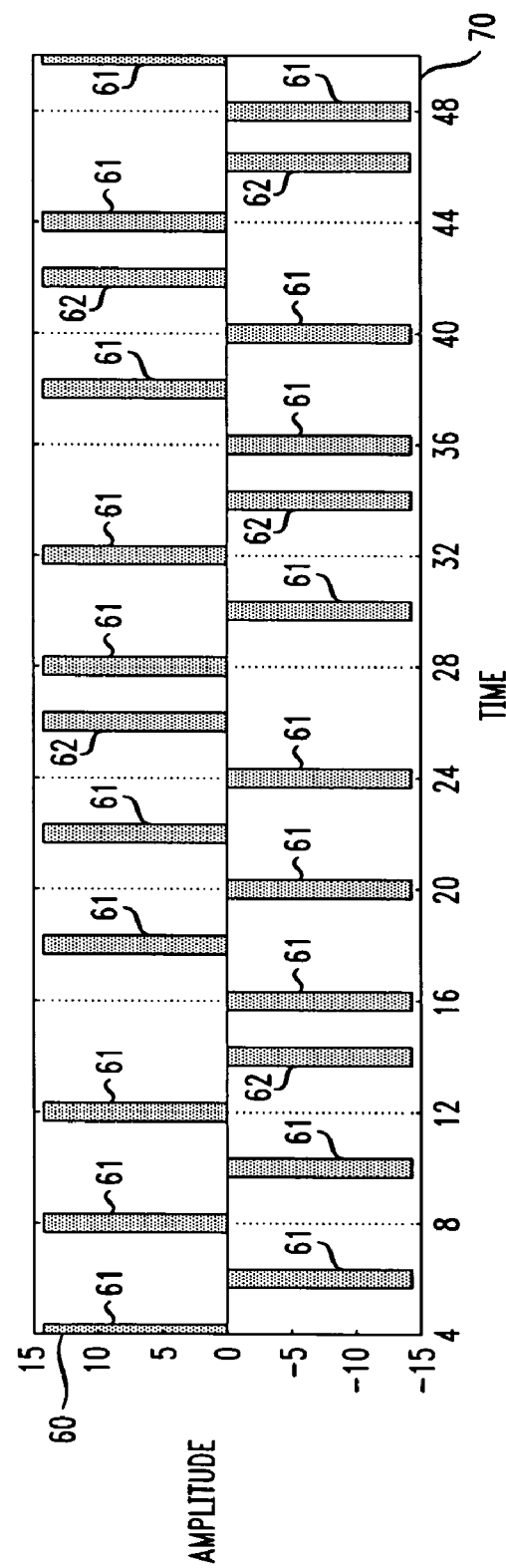

US 7,193,801 B2

METHOD AND APPARATUS FOR TESTING A SERVO CIRCUIT OF A READ/WRITE HEAD SYSTEM

TECHNICAL FIELD OF THE INVENTION

The invention relates to a read/write head system of a disk drive digital storage system, and more particularly, to a method and apparatus for testing a servo circuit of such a read/write head system.

BACKGROUND OF THE INVENTION

A typical magnetic disk drive digital storage system includes a read/write head system that controls the reading of information from and the writing of information to the magnetic disk. A servo system of the read/write head system controls the positioning of a read/write head relative to the disk when reading information from and writing information to the disk. FIG. 1 illustrates a block diagram of a typical servo circuit 1 of a typical disk drive read/write head system (not shown). The servo circuit 1 operates in two modes, namely, a normal mode of operations during which real data 2 is read from or written to the disk (not shown) and a test mode during which test patterns generated by a test pattern generator 4 are used to test the servo control logic 6 of the servo circuit 1.

During the normal mode of operations, the test mode signal 7 is deasserted and the multiplexer (MUX) 5 selects the real data 2 for processing by the servo control logic 6. Once the servo circuit 1 has been incorporated into a disk drive system, the test mode signal typically remains deasserted at all times such that the MUX 8 always selects real data 2 read from the disk drive and processed by the read channel preprocessing circuitry (not shown).

Prior to incorporating the servo circuit 1 into a disk drive system, the servo control logic 6 is tested to determine whether it is operating correctly. In order to test the servo control logic 6, the test mode signal 7 is asserted and the multiplexer 5 selects the test patterns generated by the pattern generator 4 for processing by the servo control logic 6. The servo control logic 6 processes the test patterns and generates output signals that are compared by a signal comparator 8 with stored signatures to determine whether the servo control logic 6 is operating correctly.

During testing, the servo control logic 6 attempts to detect certain patterns, or fields, within the test patterns generated by the test pattern generator 4. One of these patterns is a preamble pattern typically referred to as the best phase select (BPS) pattern. Another of these patterns is a sync mark pattern. The BPS pattern typically contains all binary 1's and precedes the sync mark pattern. The sync mark pattern is a pattern of binary 1's and 0's. Because the BPS pattern contains all 1's, it is a very regular pattern having peak amplitude values that are easily detected by the servo control logic 6. The peaks of the BPS pattern have a fixed phase relationship to the peaks of the sync mark pattern. Once the servo control logic 6 determines the phase of the peaks of the BPS pattern, the servo control logic 6 can locate the sync mark pattern by using the known phase relationship between the peaks of the BPS pattern and the peaks of the sync mark pattern. The sync mark pattern identifies the track at which the read/write head is located.

One known technique for generating the BPS and sync mark patterns for testing the servo control logic 6 involves generating a pseudo-random bit stream. In theory, a pseudo-random bit stream will contain a variety of different patterns of 1's and 0's. However, because the patterns are pseudo-random, many clock cycles may occur before the pattern that the servo control logic 6 is trying to detect appears. If a pattern that the servo control logic 6 is trying to detect does not appear within a certain time period, the state machine of the servo control logic 6 typically moves to a subsequent state and begins trying to detect a different pattern. For example, if the servo control logic 6 does not detect a BPS pattern within a certain time period, the servo control logic 6 will typically bypass the BPS pattern detection state. When the servo control logic 6 bypasses the BPS pattern detection state, it enters the sync mark detection state, during which the servo control logic 6 begins trying to detect the sync mark pattern. Therefore, in this case, the ability of the servo control logic 6 to detect the BPS pattern is not tested, which of course is a problem.

Another known technique for generating BPS and sync mark patterns involves generating bit patterns that are similar or identical to the types of patterns that would be read from the disk and processed by the read channel preprocessing circuitry (i.e., the preamplifier, analog-to-digital converter, etc.). With this technique, the pattern generator 4 generates real bit streams containing BPS and sync mark patterns and the servo control logic 6 attempts to detect the BPS and sync mark patterns. This technique generally ensures that none of the states of the state machine of the servo control logic 6 will be bypassed, and thus that the ability of the servo control logic 6 to detect all of the patterns will be tested. However, generating these real bit streams involves mathematical convolution, which requires expensive hardware that consumes a large area on the IC that contains the pattern generator 4.

Accordingly, a need exists for a test pattern generator that is relatively simple and inexpensive to implement and that ensures that the ability of the servo control logic to detect desired patterns will not go untested.

SUMMARY OF THE INVENTION

The invention provides a test pattern generator for generating test patterns for testing a servo circuit of a read/write head system. The pattern generator uses an encoding technique to produce encoded test patterns that have peaks with phase characteristics similar or identical to the phase characteristics of peaks of real data patterns, such as real BPS and sync mark patterns, for example, stored on a hard disk. The encoded data patterns are output to servo control logic to test the ability of the servo control logic to detect the patterns. The phase characteristics of the peaks of the encoded test patterns ensure that the ability of the servo control logic to detect these patterns will not go untested and that the corresponding testing states will not be bypassed.

The apparatus of the invention is a pattern generator that generates test patterns. The pattern generator comprises pattern generation logic configured to generate a data pattern having a selected pattern of data values, and data pattern encoding logic configured to encode the generated data pattern in accordance with a selected encoding algorithm. The encoded data pattern has a plurality of peaks and two or more of the peaks have a predetermined phase relationship to one another.

The method of the invention comprises generating a data pattern having a selected pattern of data values and encoding the generated data pattern in accordance with an encoding algorithm. The encoded data pattern has a plurality of peaks and two or more of the peaks have a predetermined phase relationship to one another.

In accordance with one embodiment, the method comprises generating a data pattern having a series of binary one's that represent a preamble pattern and a series of binary one's and zero's that represent a sync mark pattern, selecting a peak amplitude value to be used to encode the preamble and sync mark patterns, and encoding the generated data pattern in accordance with a selected encoding algorithm.

The invention also provides a computer program for generating test patterns. The computer program is embodied on a computer-readable medium and comprises a first code segment for generating a data pattern having a selected pattern of data values, and a second code segment for encoding the generated data pattern in accordance with a selected encoding algorithm that generates an encoded data pattern. The encoded data pattern has a plurality of peaks and the phase relationship of a plurality of the peaks to one another is predetermined.

These and other features and advantages of the invention will become apparent from the following description, drawings and claims.

BRIEF DESCRIPTION OF THE DRAWINGS

FIG. 3A is a graph illustrating the peaks of a real data stream read from a disk drive and processed by typical preprocessing circuitry of a typical read channel.

FIG. 3B is a graph illustrating the peaks of an encoded pattern generated by the pattern generator of the invention using the encoding technique of the invention in accordance with the preferred embodiment.

DETAILED DESCRIPTION OF THE PREFERRED EMBODIMENT

In accordance with the present invention, a test pattern generator is provided for generating patterns for testing a servo circuit of a read/write head system. The pattern generator uses a relatively simple encoding technique to produce test patterns that have peaks with phase characteristics similar or identical to the phase characteristics of peaks of real data patterns contained on a hard disk, such as real BPS and sync mark patterns, for example.

Figure 1:
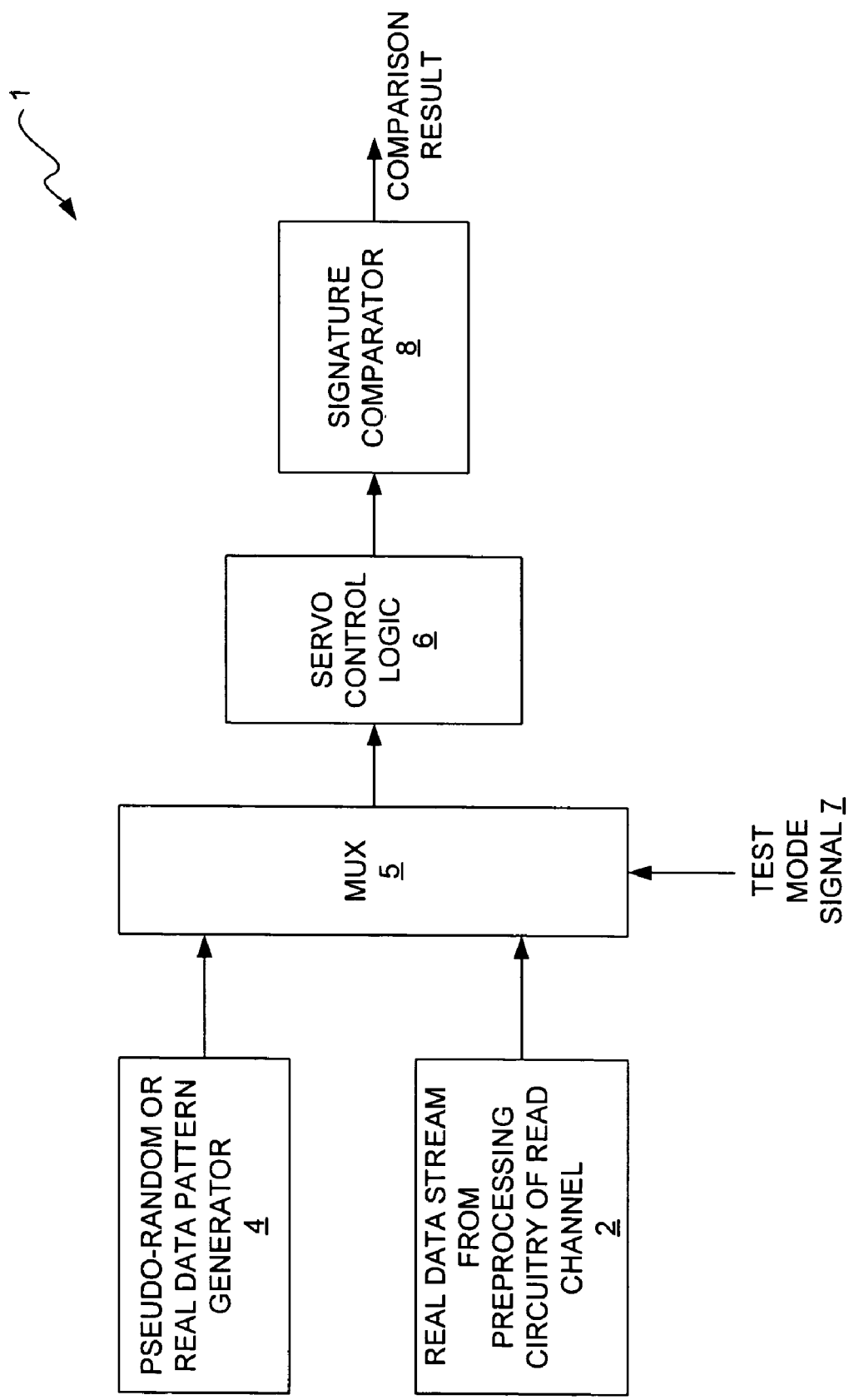
FIG. 1 illustrates a block diagram of a typical servo circuit of a read/write head system.
Figure 2:
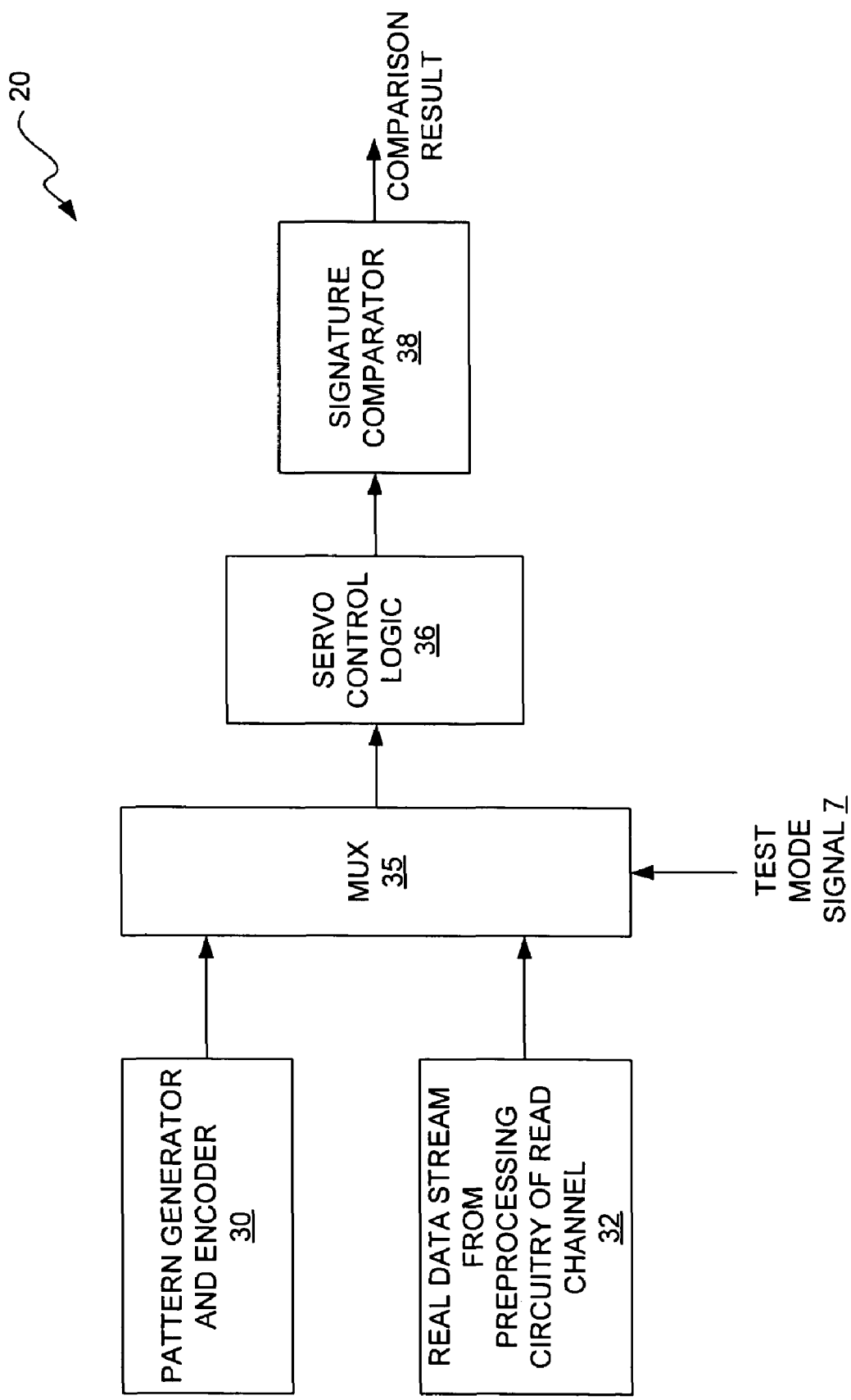
FIG. 2 illustrates a block diagram of the servo circuit of the present invention in accordance with the preferred embodiment.

FIG. 2 illustrates a block diagram of the servo circuit 20 of the present invention in accordance with an exemplary embodiment. The components 32, 35, 36 and 38 of the servo circuit 20 shown in FIG. 2 may be identical to components 2, 5, 6 and 8, respectively, of the known servo circuit 1 shown in FIG. 1. Therefore, in the interest of brevity, the operations of components 32, 35, 36 and 38 shown in FIG. 2 will not be described.

The pattern generator 30 of the invention includes logic configured to generate a pattern of bits corresponding to a preamble field, which is typically all 1's, and a sync mark pattern of 1's and 0's. The BPS and sync mark patterns are known patterns that can be varied by the user in accordance with the disk drive system in which the servo circuit 20 is to be used. The pattern generator 30 also includes encoding logic configured to encode the BPS and sync mark patterns. The encoding preferably is accomplished as follows:

each 0 is encoded into (0,−A,0,A)     (Equation 1)

each 1 is encoded into (0,A,0,−A),     (Equation 2)

where "A" is the typical peak, or maximum, amplitude of the data stream read from the disk and preprocessed by the preprocessing circuitry (not shown) of the read channel. The value of "A" used during encoding is typically selected by the person testing the servo circuit 20. This value typically depends on the disk drive system with which the servo circuit 20 is intended to be used.

The manner in which the pattern generator 30 of the invention generates encoded data patterns having peak phase characteristics that resemble or are identical to peak phase characteristics of real data patterns will now be demonstrated with reference to FIGS. 3A and 3B. FIG. 3A is a graph illustrating real data values read from a disk and processed by read channel preprocessing circuitry of a disk drive system. The vertical axis 40 corresponds to amplitude and the horizontal axis 50 corresponds to time. The peaks (i.e., the maximum value) for the real data values shown in FIG. 3A are +28 and −28. The peaks are designated in FIG. 3A by reference numeral 41.

FIG. 3B is a graph illustrating data values that have been generated and encoded by the pattern generator 30 of the invention. Like FIG. 3A, the vertical axis 60 corresponds to amplitude and the horizontal axis 70 corresponds to time. The peak amplitude value selected in this example for the generated data values is 14 (i.e., A=14). The data pattern shown in FIG. 3B corresponds to the combined preamble and sync mark pattern 111000110010 after it has been encoded by the encoding technique of the invention described above with respect to Equations 1 and 2. The encoding produces the following values: (0,14,0,−14),(0, 14,0,−14), (0,14,0,−14), (0,−14,0,14), (0,−14,0,14), (0,−14, 0,14), (0,14,0,−14), (0,14,0,−14), (0,−14,0,14), (0,14,0−14), (0,14,0,−14), and (0,−14,0,14).

From a comparison of FIGS. 3A and 3B, it can be seen that the pattern encoded in accordance with the invention, which is shown in FIG. 3B, has peaks 61 at the same points in time where the peaks 41 shown in FIG. 3A occur. However, the encoded data pattern shown in FIG. 3B has a few peaks 62 that are not in the real data pattern shown in FIG. 3A. In particular, for each of the peaks 41 in FIG. 3A there is a corresponding peak 61 in FIG. 3B at the respective points in time. However, the encoded data pattern shown in FIG. 3B has a few peaks 62 that are not contained in the real data pattern shown in FIG. 3A at the respective points in time. Nevertheless, the phase relationships of the peaks of the encoded data pattern shown in FIG. 3B is sufficiently similar to the phase relationships of the peaks of a real data pattern shown in FIG. 3B to enable the servo control logic 36 to be fully tested without bypassing any states.

Also, the amplitude of the peaks 41 shown in FIG. 3A is different from the amplitude of the peaks 61 shown in FIG. 3B. The peak amplitude value "A" used to encode the data stream represented by FIG. 3B is 14 whereas the actual peak amplitude value for the real data stream represented by the plot shown in FIG. 3A is 28. This difference in amplitude does not affect the ability of the servo control logic 36 to detect the encoded data patterns because the servo control logic analyzes phase relationships among the peaks rather than amplitude characteristics.

In addition, a few of the non-zero values of the real data pattern shown in FIG. 3A that are not peak values are not contained in the encoded data pattern shown in FIG. 3B. For example, the real data pattern shown in FIG. 3A has non-zero, non-peak values 51, 52, 53, 54 and 55 at times t=13, t=15, t=25, t=27 and t=33, respectively, which are not contained in FIG. 3B. Nevertheless, the phase relationships of the peaks of the encoded data stream shown in FIG. 3B sufficiently resembles the phase relationships of the peaks of the real data stream shown in FIG. 3A to enable the servo control logic 36 to be fully tested without being forced to bypass any testing states.

The manner in which the peaks shown in FIG. 3B can be decoded will now be described. The amplitude values at t=3, t=4, t=5 and t=6 are 0, 14, 0 and −14, respectively, corresponds to a binary 1 based on the encoding technique represented by Equation 2. The graph in FIG. 3B starts at time t=4. Therefore, the amplitude value corresponding to t=3 is not shown in FIG. 3B, but it is 0. The amplitude values at times t=7, t=8, t=9 and t=10 are 0, 14, 0 and −14 , respectively, which corresponds to a binary 1 based on Equation 2. Likewise, the amplitude values at t=11, t=12, t=13 and t=14 are 0, 14, 0 and −14, respectively, which corresponds to a binary 1 based on Equation 2. The amplitude values at t=15, t=16, t=17 and t=18 are 0, −14, 0 and 14, respectively, which corresponds to a binary 0 based on the encoding technique represented by Equation 1. Likewise, the amplitude values at t=19, t=20, t=21 and t=22 are 0, −14, 0 and 14, respectively, which corresponds to a binary 0 based on Equation 1. Likewise, the amplitude values at t=23, t=24, t=25 and t=26 are 0, −14, 0 and 14, respectively, which corresponds to a binary 0 based on Equation 1. Using this decoding algorithm for the remainder of the amplitude values shown in FIG. 3B produces the remainder of the decoded bits: 110010. Thus, the combined preamble and sync mark bit pattern referred to above of 111000110010 is recovered by decoding the encoded data pattern using the algorithm represented by equations 1 and 2.

It can be seen from all of the above that the present invention provides a pattern generator 30 that uses a relatively simple pattern generation and encoding technique to produce encoded patterns that closely resemble real data patterns read from a disk drive and processed by the read channel circuitry. No mathematical convolution operations are required, and thus no expensive convolution hardware is needed. In addition, because the phase relationships of the peaks of the encoded data patterns generated by the pattern generator 30 very closely resemble or are identical to the phase relationships of the peaks of real patterns, it will not be necessary for the servo control logic to bypass any states during testing. It should be noted that the invention is not limited to the encoding and decoding techniques described above with reference to Equations 1 and 2.

Figure 4:
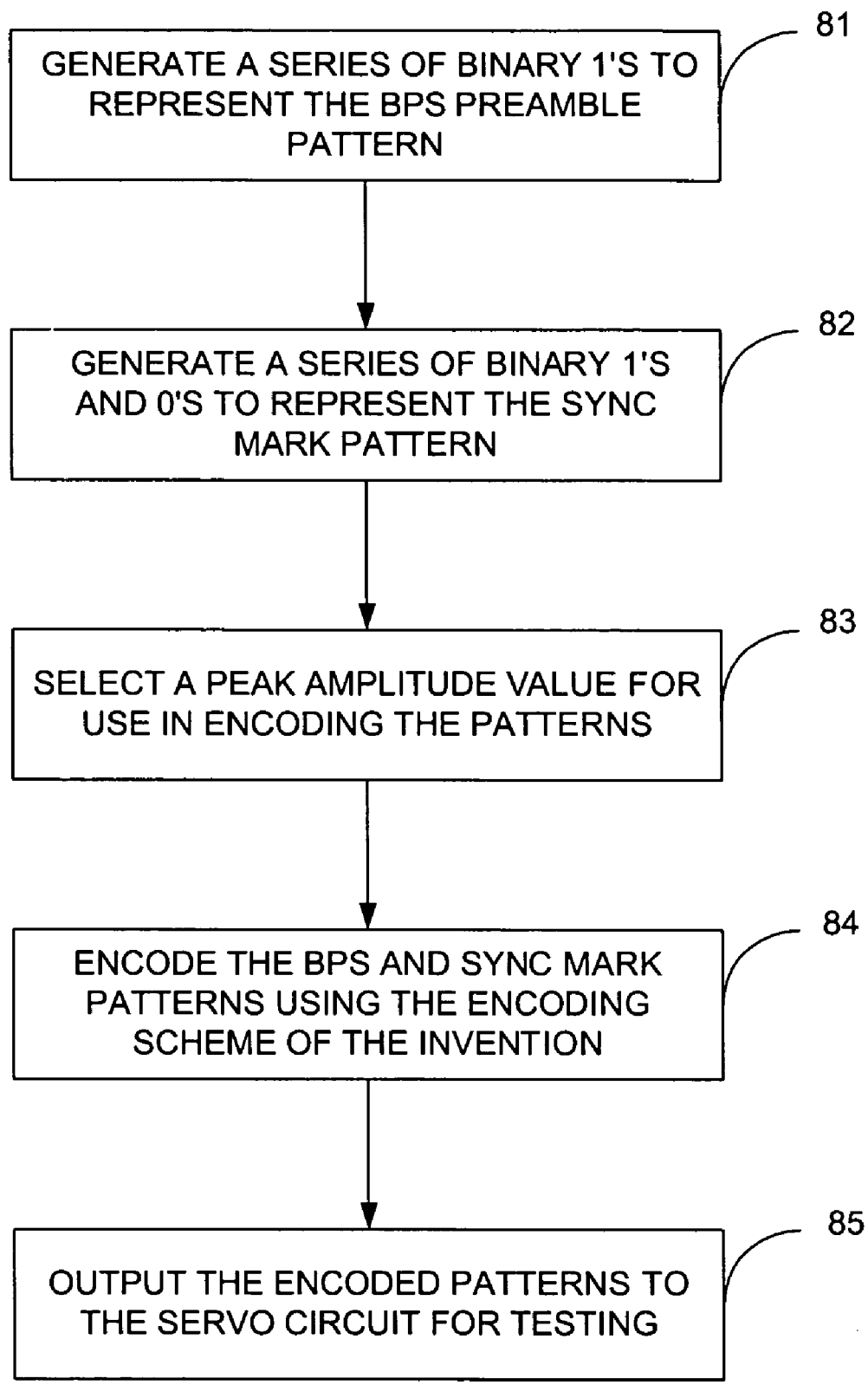
FIG. 4 illustrates a flow chart of the method of the invention in accordance with an example embodiment for generating test patterns that may be used to test a servo circuit.

FIG. 4 illustrates a flow chart of the method of the invention in accordance with an exemplary embodiment for testing the servo circuit. In accordance with this embodiment, the pattern generator of the invention generates a series of binary 1's to represent the BPS preamble, as indicated by block 81. The pattern generator also generates a series of 1's and 0's to represent the sync mark pattern, as indicated by block 82. An amplitude value, "A", is selected based on the disk drive system with which the servo circuit is intended to be employed, as indicated by block 83. The BPS and sync patterns are then encoded using the encoding technique represented by Equations 1 and 2, as indicated by block 84. The encoded bit patterns are then output to the servo control logic, as indicated by block 85.

With reference again to FIG. 2, the servo control logic 36 detects the generated patterns and produces output signals that are processed by the signal comparator circuit 38. The signal comparator circuit 38 compares the signals received from the servo control logic 36 with stored signals and produces comparison result output signals that indicate whether the servo control logic 36 correctly detected the patterns generated by the pattern generator 30. The manner in which the signal comparator 38 processes the output signals received from the servo circuit 36 and produces the comparison results is known. Therefore, a discussion of the algorithms that perform these functions will not be provided herein in the interest of brevity.

Although the invention has been described with reference to particular embodiments, it should be understood that the invention is not limited to the embodiments described herein. For example, although the invention has been described with reference to detecting BPS and sync mark patterns, the invention equally applies to detecting other types of patterns, such as gray code patterns, for example. The peaks of gray code patterns, like the peaks of sync mark patterns, have known phase relationships to the peaks of the BPS pattern. Consequently, the encoding scheme described above with reference to Equations 1 and 2 can be used to encode gray code patterns to test the ability of the servo circuit 36 to detect such patterns.

It should also be noted that the invention is not limited with respect to the physical implementation of the pattern generator 30. The pattern generator 30 is typically implemented as an IC that is separate from the IC that contains the servo control logic 36, although this is not necessarily the case. The invention is not limited to any particular logical or physical implementation for the pattern generator 30. Those skilled in the art will understand that other modifications may be made to the embodiments described herein and that all such modifications are within the scope of the present invention.

What is claimed is:

1. A pattern generator comprising:
    pattern generation logic configured to generate a data pattern having a selected pattern of data values; and
    data pattern encoding logic configured to encode the generated data pattern in accordance with a selected encoding algorithm, the encoded data pattern having a plurality of peaks, and wherein two or more of the peaks have a predetermined phase relationship to one another, wherein the generated data pattern includes binary ones and binary zeros, the encoding logic encoding each binary zero as (0, −A, 0, A) and each binary one as (0, A, 0, −A), where "A" corresponds to a peak amplitude value.

2. The pattern generator of claim 1, wherein the encoded data pattern includes an encoded preamble pattern and an encoded sync mark pattern.

3. The pattern generator of claim 2, wherein the encoded data pattern includes a gray code pattern.

4. The pattern generator of claim 2, wherein the encoded preamble and sync mark patterns each include a series of said peaks, and wherein the peaks of the preamble pattern have a known phase relationship to each other, and wherein the peaks of the sync mark pattern have a predetermined phase relationship to the peaks of the preamble pattern.

5. A method for generating test patterns comprising:
    generating a data pattern having a selected pattern of data values; and
    encoding the generated data pattern in accordance with a selected encoding algorithm to generate an encoded data pattern, the encoded data pattern having a plurality of peaks, and wherein two or more of the peaks have a predetermined phase relationship to one another, and wherein the generated data pattern includes binary ones and binary zeros, each binary zero being encoded as (0, −A, 0, A) and each binary one being encoded as (0, A, 0, −A), where "A" corresponds to a peak amplitude value.

6. The method of claim 5, wherein the encoded data pattern includes an encoded preamble pattern and an encoded sync mark pattern.

7. The method of claim 6, wherein the encoded data pattern includes an encoded gray code pattern.

8. The method of claim 6, wherein the encoded preamble and sync mark patterns each include a series of said peaks, and wherein the peaks of the preamble pattern have a predetermined phase relationship to each other, and wherein the peaks of the sync mark pattern have a predetermined phase relationship to the peaks of the preamble pattern.

9. A method for generating test patterns comprising:
generating a data pattern having a series of binary one's that represent a preamble pattern and a series of binary one's and zero's to represent a sync mark pattern;
selecting a peak amplitude value to be used to encode the preamble and sync mark patterns; and
encoding the generated data pattern in accordance with a selected encoding algorithm, wherein the generated data pattern includes binary ones and binary zeros, each binary zero being encoded as (0, −A, 0, A) and each binary one being encoded as (0, A, 0, −A), where "A" corresponds to a peak amplitude value.

10. The method of claim 9, wherein the encoded data pattern has a plurality of peaks, and wherein the phase relationship of a plurality of the peaks to one another is predetermined.

11. A computer program for generating test patterns, the computer program being embodied on a computer-readable medium, the program comprising:
a first code segment for generating a data pattern having a selected pattern of data values; and
a second code segment for encoding the generated data pattern in accordance with a selected encoding algorithm that generates an encoded data pattern, the encoded data pattern having a plurality of peaks, and wherein the phase relationship of a plurality of the peaks to one another is predetermined, wherein the second code segment encodes the data pattern by encoding each binary zero being as (0, −A, 0, A) and each binary one as (0, A, 0, −A), where "A" corresponds to a peak amplitude value.

12. A servo circuit testing system for a read/write head system, comprising:
pattern generation logic configured to generate a data pattern having a selected pattern of data values;
data pattern encoding logic configured to encode the generated data pattern in accordance with a selected encoding algorithm, the encoded data pattern having a plurality of peaks, and wherein two or more of the peaks have a predetermined phase relationship to one another;
servo control logic;
a multiplexer for routing the encoded data pattern to the servo control logic when a mode signal indicates the read/write head system is in a test mode and for routing data from a read channel to the servo control logic when the mode signal indicates the read/write head system is not in the test mode; and
a signature comparator for comparing data output by the servo control logic to expected data when the read/write head system is in the test mode.

13. The servo circuit testing system claim 12, wherein the encoded data pattern includes an encoded preamble pattern and an encoded sync mark pattern.

14. The servo circuit testing system of claim 13, wherein the encoded data pattern includes a gray code pattern.

15. The servo circuit testing system of claim 13, wherein the encoded preamble and sync mark patterns each include a series of said peaks, and wherein the peaks of the preamble pattern have a known phase relationship to each other, and wherein the peaks of the sync mark pattern have a predetermined phase relationship to the peaks of the preamble pattern.

* * * * *